United States Patent
Beatty

[11] 3,875,870
[45] Apr. 8, 1975

[54] CONVERTIBLE RAIL-HIGHWAY VEHICLE AXLE ASSEMBLY

[75] Inventor: William T. Beatty, Alexandria Bay, N.Y.

[73] Assignee: Rail-or-Trail Corp., Syracuse, N.Y.

[22] Filed: July 19, 1973

[21] Appl. No.: 380,840

[52] U.S. Cl. .......................... 105/215 C; 180/22 D
[51] Int. Cl. ..... B61d 15/00; B61f 9/00; B62d 61/12
[58] Field of Search ....... 104/24 Z, 245; 105/215 C; 180/22 D

[56] References Cited
UNITED STATES PATENTS

| | | | |
|---|---|---|---|
| 1,446,784 | 2/1923 | Carter | 105/215 C |
| 1,543,452 | 6/1925 | Seitz et al. | 105/215 C |
| 1,863,575 | 6/1932 | Moncrieff et al. | 105/215 C |
| 2,138,043 | 11/1938 | Ronk | 105/215 C |
| 2,140,885 | 12/1938 | Soulis | 105/215 C |
| 2,981,209 | 4/1961 | Flemming | 105/215 C |

Primary Examiner—M. Henson Wood, Jr.
Assistant Examiner—Howard Beltran
Attorney, Agent, or Firm—Burns & Jenney

[57] ABSTRACT

An axle assembly has an axle capable of limited rotation for raising and lowering one set of wheels. At each end the axle has secured thereto an extension having a spindle adapted for rotatably carrying a flanged railway wheel, the spindle being secured and keyed to the axle end. The extension also has a radial arm carrying an offset spindle for rotatably carrying a highway wheel. In each of four embodiments brake means are provided comprising a drum member and a shoe member, one member being moveable with respect to the other. In one embodiment each wheel carries a gear and a planetary shaft carried by the radial arm has a gear at each end in mesh with a respective wheel carried gear. One brake member is carried by the railway wheel and the other member by the axle at its center. In another embodiment one brake member is carried by the highway wheel and the other member is carried by the radial arm. Means for operating the other brake member includes operating means passing in an axial direction through the railway wheel spindle. In the other two embodiments the center portion of the axle is offset and the axle end has an axial passage therethrough. In the third embodiment this passage carries a shaft with a gear at each end, one gear in mesh with a gear on the highway wheel and the other gear in mesh with a gear on an offset shaft carried by the axle. One brake member is secured to the offset shaft and the other brake member is carried by the offset portion of the axle. In the fourth embodiment one brake member is carried by the highway wheel and the other, moveable member is carried on the offset arm of the extension. Operating means for the latter member include means passing through the axial passage through the axle end and means secured to the center portion of the axle or to the vehicle carrying the axle.

5 Claims, 12 Drawing Figures

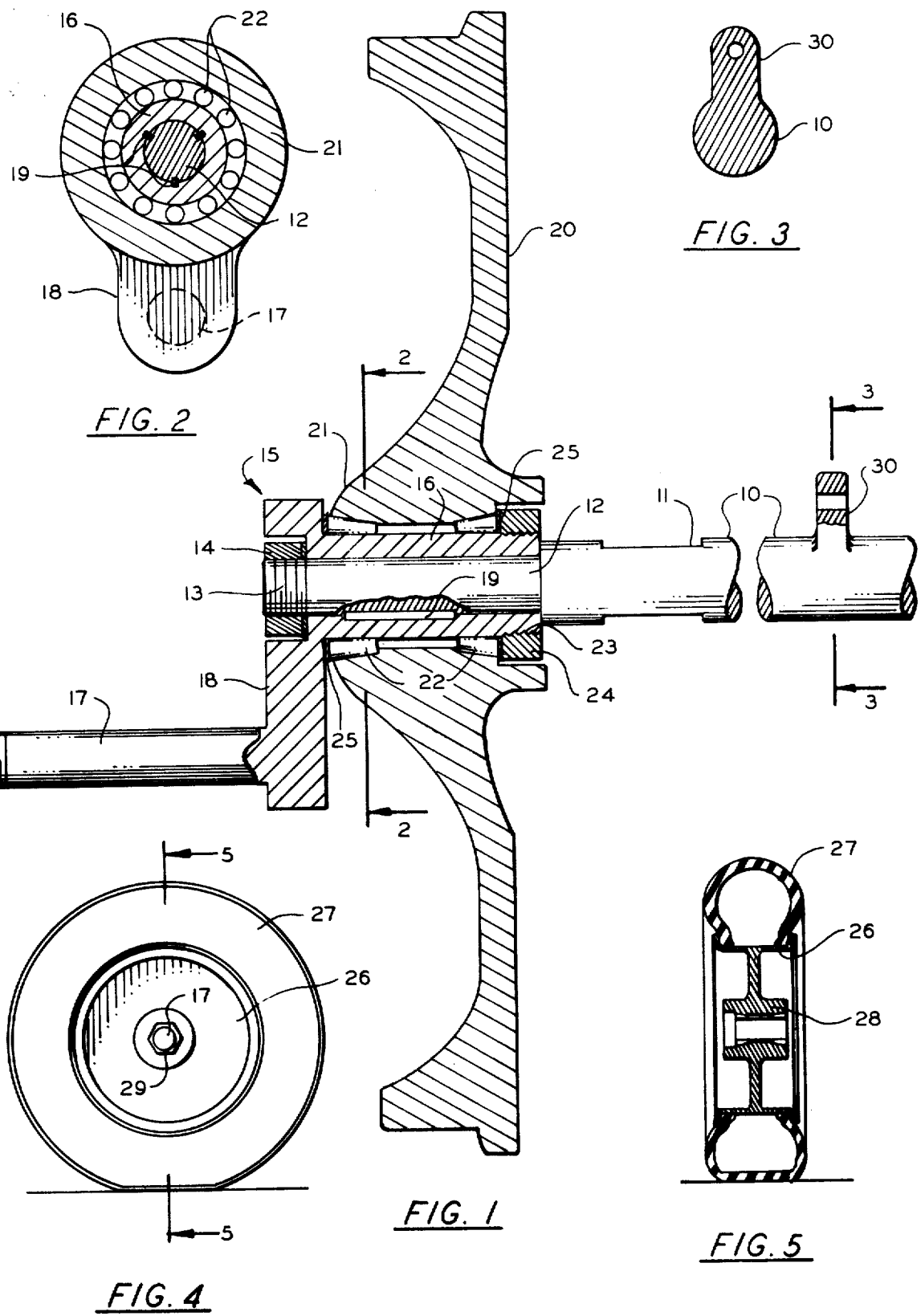

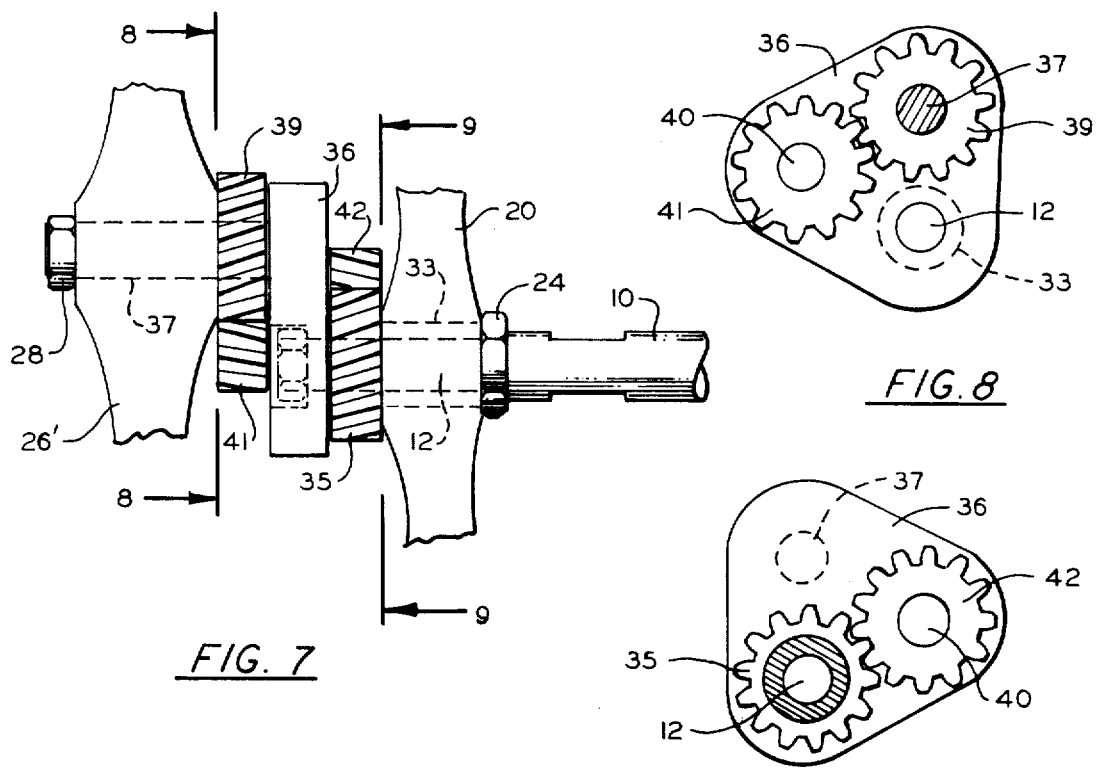
FIG. 7
FIG. 8
FIG. 9
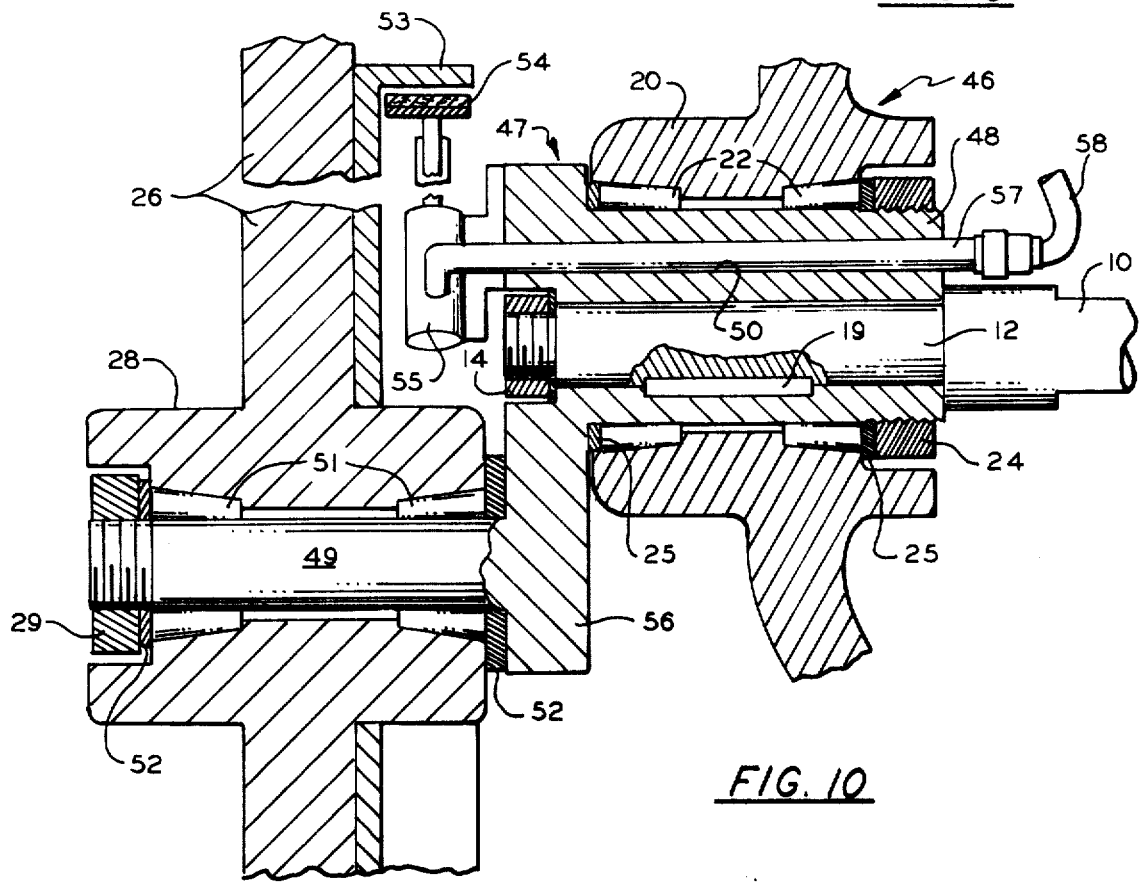
FIG. 10

3,875,870

CONVERTIBLE RAIL-HIGHWAY VEHICLE AXLE ASSEMBLY

BACKGROUND OF THE INVENTION

This invention relates generally to a railway boxcar type of vehicle quickly convertible to a highway trailer. More particularly it relates to a rear axle assembly providing both railroad wheels and highway wheels on the same carriage with provision for adequate brakes for both types of wheels.

In general, the axle is of the type disclosed in expired U.S. Pat. No. 1,543,452 to Seitz dated June 23, 1925 wherein one wheel at each end of the axle is journalled coaxially with the axle and the other wheel is journalled on an offset spindle so that, by turning the axle, the wheel mounted on the offset spindle can be raised and lowered. Such arrangement as heretofore known has been unsatisfactory in that the axle for such an arrangement must be split at the middle so that the coaxially journalled wheel may be assembled, or the wheel itself must have a split hub and bearings and a split axle casing must be used.

Such split parts do not permit an undercarriage sufficiently rugged to carry a heavy load and withstand the buffeting of either railway or highway transportation.

Another type of vehicle with both railway and highway wheels is shown in expired U.S. Pat. No. 2,140,885 to Soulis, issued Dec. 20, 1938. This type of vehicle has a rail wheel or highway wheel having a carriage separate from that for the other wheel. One or both carriages can be swung up or down to employ the other wheel or to supplant it. Recent development of this type of vehicle has resulted in a vehicle too heavy to be practical because of the double carriages.

Another type of railway-highway vehicle is disclosed in U.S. Pat. No. 2,138,043 to Ronk, issued Nov. 29, 1938, in which an annular rail wheel is provided having a large central opening through which the highway wheel axle projects so that this axle may be raised or lowered. The difficulty with this arrangement is that it is difficult to provide adequate journal means on which the rail wheel can rotate.

Still another type of railway-highway vehicle disclosed in U.S. Pat. No. 2,981,209 to Flemming issued in 1961 provides a central hub at each end of the axle to which either a rail wheel or a highway wheel may be bolted. This is disadvantageous in that it takes too long and too much labor to convert the wheels from for one mode of travel to the other mode.

Another difficulty with all the prior art convertible wheel vehicles, where railway wheel and highway wheel are mounted side by side, is the space limitation for adequate brake means for the highway wheels. State vehicle laws limit the overall width of a vehicle which can operate on the highway and track width or gauge is standard. Strength limitations dictate the width of the railway wheel flange and the tire tread width of the highway wheel. These considerations necessitate that the lateral spacing between rail and highway wheel be narrow, limiting the space available for the drum and shoe portions of the highway brake and presenting problems in providing operating connections to this brake.

SUMMARY OF THE INVENTION

The invention contemplates a single axle for both a railway wheel and a highway wheel at each end. This axle can be turned by conventional means such as a hydraulic cylinder and piston a little less than 180° to raise or lower the highway wheels.

At each end of the axle a separate axle extension is assemblable thereon providing a spindle for the railway wheel and an offset spindle for the highway wheel joined by a radially extending arm which is useful in providing brake operating connections, as will appear. The railway wheel spindle is secured to the axle by suitable nuts and is splined or keyed thereto. The highway wheel spindle is threaded at its end for a wheel retaining nut. Adequate bearings and suitable seals are provided for each spindle assemblable when assembling the extension and wheels.

It will be apparent that restrictions on the total width of a vehicle for highway use and the standard track width for railway use impose limitations in the space available between highway and railway wheels. Proper braking means for the highway wheel must be provided. Such braking means conventionally comprise a drum member and a shoe member, one member being moveable with respect to the other for frictional engagement between the members. It will be understood that the words "brake drum," as hereinafter used include a brake member in the form of a disk and a pinch type shoe may be provided as the other moveable member. In all cases one member must be rotatable with the highway wheel and the other member must be supported on a normally non-rotating portion of the vehicle.

Four embodiments are provided employing drum and shoe members in different manners to provide adequate brakes for the highway wheel. A conventional railway wheel brake employing a shoe adapted to be swung into contact with the rail wheel flange which contacts the rail can be employed for the railway wheel.

In one embodiment of the invention, the highway wheel has secured thereto a coaxial gear in mesh with a planetary gear secured on a planetary shaft extending through and journalled in the radially extending arm. On the other end of the planetary shaft another gear is secured in mesh with a gear secured coaxially to the railway wheel. The inner surface of the railway wheel is provided with one brake member such as a brake drum or disk, and being between the railway wheels, there is ample room for supporting and securing the other brake member such as a brake shoe on the axle.

Another embodiment has the aperture in the railway wheel spindle for the end of the axle located off-center of the spindle providing clearance for another passage of the spindle in the spindle through which a lever or a tube may pass to operate the moveable highway wheel brake shoe against the drum or disk member secured to the inner surface of the highway wheel.

Still another embodiment has a passage extending axially through the end of the axle, the axle being offset at the inner end of this passage. A gear secured coaxially on the highway wheel is in mesh with a gear secured on one end of a shaft rotatably mounted in the axle-end passage. Another gear on the other end of the passage shaft is located at the central offset portion of the axle and is in mesh with another gear mounted on a planetary shaft journalled on another offset portion of the axle. The other end of the planetary shaft is secured to a brake drum or disk member and a cooperating shoe is supported on the offset shaft between the two railroad wheels where there is adequate space.

A variant of the latter embodiment has no brake drum operating gears and the drum or disk member is secured to the highway wheel. Instead of the shaft through the end of the axle there is an operating rod or a tube for hydraulic operation of the brake shoe member which is supported on the normally non-rotating offsetting arm of the axle extension.

BRIEF DESCRIPTION OF THE DRAWINGS

FIG. 1 is an axial sectional view showing one side of a combined railway and highway vehicle axle according to the invention, the opposite side being similar, except that one side is made righthand and the other side lefthand;

FIG. 2 is a sectional view on the line 2—2 of FIG. 1;

FIG. 3 is a sectional view on the line 3—3 of FIG. 1;

FIG. 4 is a side elevational view on a reduced scale and FIG. 5 is an axial sectional view on a similar scale of a highway wheel for use with the axle of FIG. 1;

FIG. 7 is a fragmentary view of the embodiment shown diagrammatically in FIG. 6;

FIG. 8 is a sectional view shown on the line 8—8 of FIG. 7;

FIG. 9 is a sectional view shown on the line 9—9 of FIG. 7;

FIG. 10 is a view similar to FIG. 1 showing another embodiment of the axle of FIG. 1 with brake means for the highway wheel;

DESCRIPTION OF THE PREFERRED EMBODIMENTS

Figure 6:
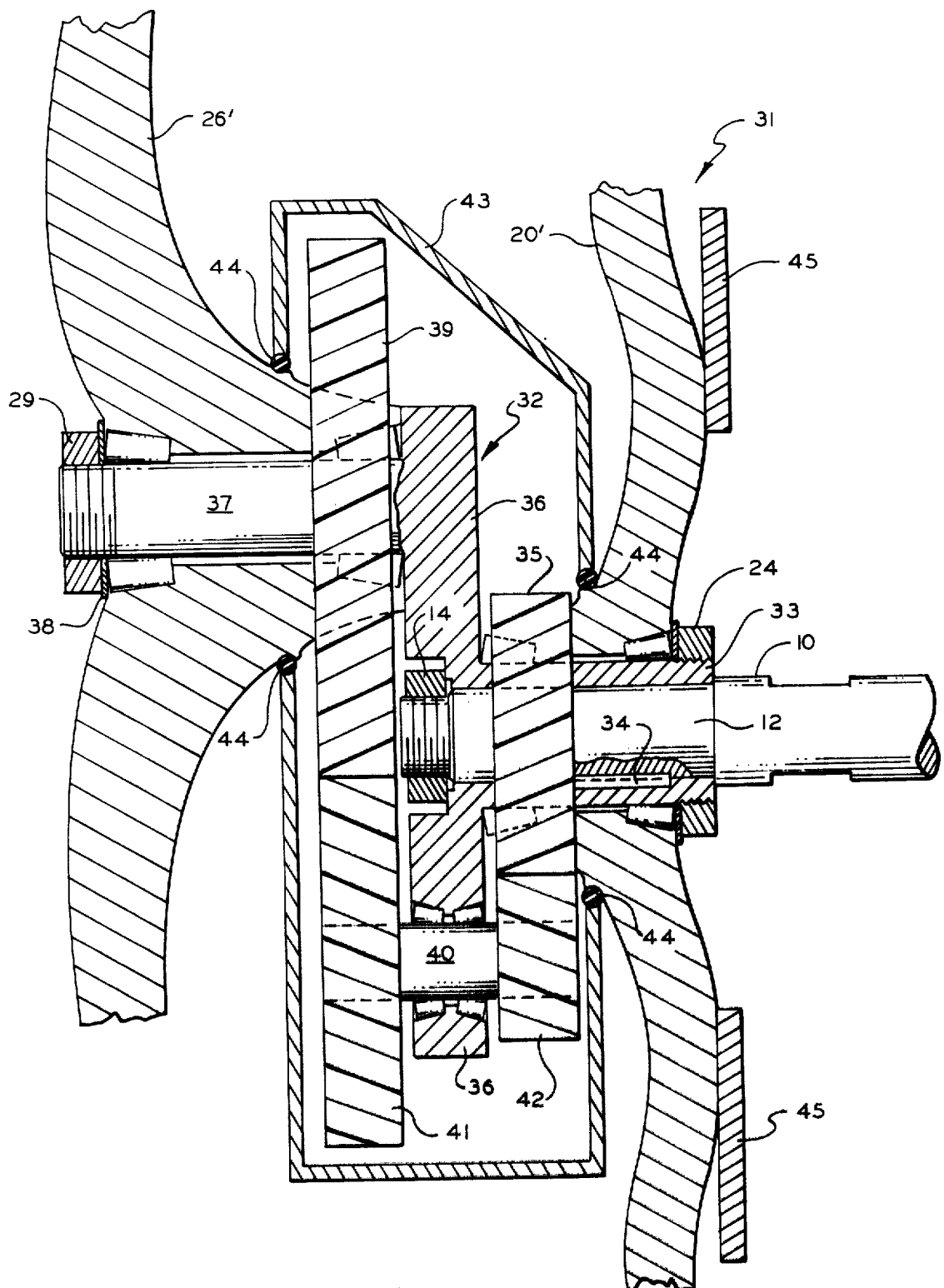
FIG. 6 is a diagrammatic view similar to FIG. 1 showing one embodiment of the axle of FIG. 1 with brake means for the highway wheel.

Referring to FIGS. 1-5, a normally non-rotating axle 10 will be understood to extend across underneath a vehicle, not shown, one end only of the axle being shown. A spring seat, indicated at 11, is provided for suitable springs on which the vehicle is supported.

A reduced end 12 of the axle is threaded at 13 for a nut 14 and an axle extension 15 is secured thereby on the axle end 12. The extension 15 comprises a tubular railway wheel spindle 16 and an offset highway wheel spindle 17 connected by an arm 18 projecting radially from the railway spindle 16.

Spindle 16 is keyed to the end 12 of the axle by a plurality of splines or keys 19, best seen in FIG. 2, and the flanged railway wheel 20 has a hub 21 rotatably mounted on the spindle 16 by means of roller bearings indicated at 22. Spindle 16 is threaded at its inner end at 23 for the nut 24 for precise adjustment of wheel 20 on its journals at 22. A grease seal 25 is provided at each end of the spindle 16.

The highway wheel 26, FIGS. 4 and 5, has the usual pneumatic tire 27 and a hub 28 equipped with bearings, not shown. Wheel 26 is adapted to be mounted on spindle 17 and secured thereon by nut 29, FIG. 4, on the threaded end of the spindle.

The shaft 10 has a radially projecting arm 30 thereon substantially at the center of the vehicle adapted to have a link pivotally secured thereto, the link being powered by motor means, such as a hydraulic cylinder and piston for rotating shaft 10 in one direction or the other substantially 120°. With such an arrangement, two or three axles such as axle 10 can be mounted one behind the other, all operated by a single hydraulic motor.

As axle 10 is rotated, the spindle 17 may be rotated, for example, from the position shown in FIG. 1, with the tire of wheel 26 engaging the road, as shown in FIG. 4 at a level several inches below the track engaging flange of wheel 20 to an elevated position with the lower portion of tire 27 elevated several inches above the flange of wheel 20. Operation of the hydraulic motor in the other direction lowers the wheel 26 again into road-engaging position.

It will be understood that in a vehicle on which one or more axles 10 are mounted as rear axle means, the front end of the vehicle may have means for mounting it on a highway tractor for towing the vehicle as a trailer with front wheels elevated above the road as described in the aforementioned U.S. Pat. No. 2,138,043. Alternatively, for highway use as a trailer, the front rail wheels, which are usually mounted on a two axle carriage, may be removed entirely at the highway-railway terminal, the front end of the trailer being mounted on the tractor.

As with all heavily laden trailers, there is a problem of supplying the trailer with adequate brakes. Referring now to FIG. 6 another embodiment of axle assembly 31, similar to that shown in FIG. 1, is diagrammatically shown in combination with one form of braking means for the highway wheel.

The axle 10 has a reduced end 12 on which an axle extension 32 is mounted. The railway wheel spindle 33 thereof is keyed thereto by one or more keys 34 and the spindle is secured thereon by the nut 14, suitable grease seals being provided at either end. The railway wheel 20' is rotatably mounted thereon by suitable bearings and a gear 35 is coaxially mounted and secured to the outer side of the hub of the wheel 20'. A nut 24 adjustably secures the wheel on the spindle.

A radially projecting arm or arms 36—36 connects spindle 33 to the offset highway wheel spindle portion 37 and the highway wheel 26', suitably journalled on its spindle, is rotatably secured thereon by the nut 29, a seal being provided at 38. The wheel 26' has a gear 39 coaxially secured to the inner side thereof.

A planetary shaft 40, suitably journalled, extends through the arm 36 angularly offset from the spindle 37. At one end of shaft 40 a gear 41 is secured in mesh with gear 39 and at the other end a gear 42 is secured in mesh with the gear 35. As wheel 26' rotates the wheel 20' is also rotated through the gear train.

A gear housing 43 rotatable with respect to both wheels surrounds the gear train and grease seals 44 are provided between the housing and each of the wheels. A brake drum in the form of disk 45 is secured to the inner side of the railway wheel 20', and a suitable shoe member, not shown, is provided mounted on shaft 10 for cooperation with the disk 45.

It will be understood that the railway wheel is braked by the disk 45 and, when extension 32 is turned to lower wheel 26', wheel 20' turns with wheel 26' and the latter wheel may be braked by the disk 45.

Referring now to FIGS. 7-9, the preferred form of the braking system diagrammatically shown in FIG. 6 is shown, the parts being numbered as in FIG. 6 but the planetary shaft 40 being angularly offset from spindle 37 by an angle less than 180° for compactness. By inspection of FIGS. 8 and 9 it will be seen that spindle 37 and shaft 40 are angularly offset about 60°.

Referring now to FIG. 10, another embodiment 46 of the axle and brake assembly is shown as having an axle 10, a railway wheel 20 and a highway wheel 26. An axle extension 47 has a spindle 48 for the railway wheel 20 and an offset spindle for the highway wheel 26. A nut 14 is provided for securing spindle 48 on the reduced end 12 of axle 10 and a nut 24 is provided by adjustably securing wheel 20 on its bearings 22. Seals 25 are provided at either end of the hub of wheel 20.

One or more keys 19 are provided for securing spindle 48 on the axle end 12, but the aperture for the axle end 12 is offset in spindle 48 leaving clearance for a passage 50 extending in an axial direction through spindle 48.

The highway wheel 26 has a hub 28 journalled by bearings at 51 on spindle 49 and secured thereon by nut 29, grease seals 52 being provided at either end of hub 28. One brake member comprising drum 53 is secured to the inner surface of wheel 26 and a cooperating brake shoe 54 is operatable by the hudraulic cylinder 55 mounted on the offsetting arm 56 of the extension 47.

A tube 57 extends through the passage 50 to the cylinder 55 for supplying hydraulic fluid thereto to operate shoe 54. The inner end of tube 57 is connected to a flexible tube 58, shown fragmentarily, it being understood that the other end of the flexible tube is connected through operating valve means to a source of fluid under pressure.

The axle extension 47 is normally nonrotating, the axle 10 being turned only to raise or lower the highway wheel 26. When axle 10 is turned the 120° necessary to raise or lower the wheel, it will be understood that the flexible tubing 58 is so disposed as to permit this turning.

Since the brake 54—54 only operates on the highway wheel 26, a conventional brake for the railway wheel 20 is also provided, though not shown.

It will also be understood that the passage 50, alternatively may contain an operating rod which may be moved to operate the shoe 54 mechanically. The linkage for moving the operating rod must be arranged with a hinged connection for permitting the 120° turning of axle 10 when wheel 26 is raised or lowered without affecting movement of the operating rod for operating the brake.

Figure 11:
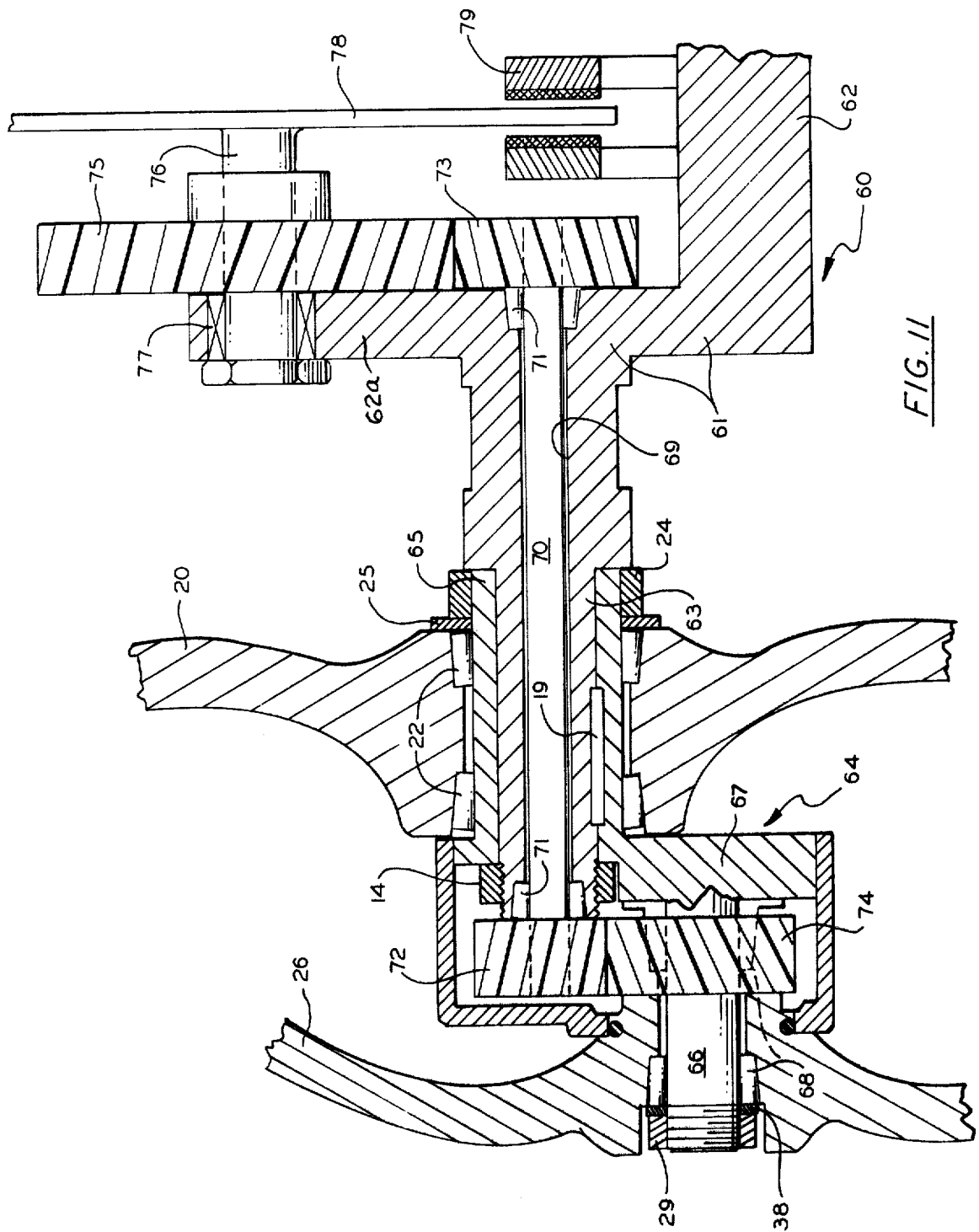
FIG. 11 is a view similar to FIG. 1 showing still another embodiment of the axle of FIG. 1 with brake means for the highway wheel.

Referring now to FIG. 11, another embodiment 60 of the axle assembly and braking means is shown fragmentarily. An axle 61 is provided with a portion 62 at the center of the vehicle which is offset from the reduced portion 63 on which the axle extension 64 is secured by nut 14 and key 19.

The extension 64 comprises the spindle 65, on which the railway wheel 20 is rotatably mounted by means of bearings 22, and an offset spindle 66 for the highway wheel 26, the two spindles being connected by a radial arm portion 67. Wheel 26 is rotatably mounted on spindle 66 by bearings at 68 and secured thereon by the nut 29, a grease seal being provided at 38.

The axle end 63 and the adjacent portion of axle 61 has an axially extending passage 69 in which a gear shaft 70 is journalled by bearings at 71—71. A gear 72 is secured to the outer end of shaft 70 between the wheels 20 and 26 and another gear 73 is secured to the inner end of shaft 70 adjacent to the offset portion 62 of the axle.

A gear 74 is coaxially secured to the highway wheel 26 in mesh with gear 72. Axle 61 is provided with a radially projecting arm 62a angularly offset from the offset portion 62 and another gear 75 is secured to a shaft 76 which is journalled at 77 on arm 62a.

The inner end of shaft 76 has one brake member in the form of a disk 78 secured thereto and the other member, the brake shoe 79, is supported on the offset portion 62 of the axle, cooperating with the disk 78 for braking the highway wheel. Operating means, now shown, for the shoe 79 are also supported on the axle and conventional brake shoe means, also not shown, are provided for the railway wheel 20.

Figure 12:
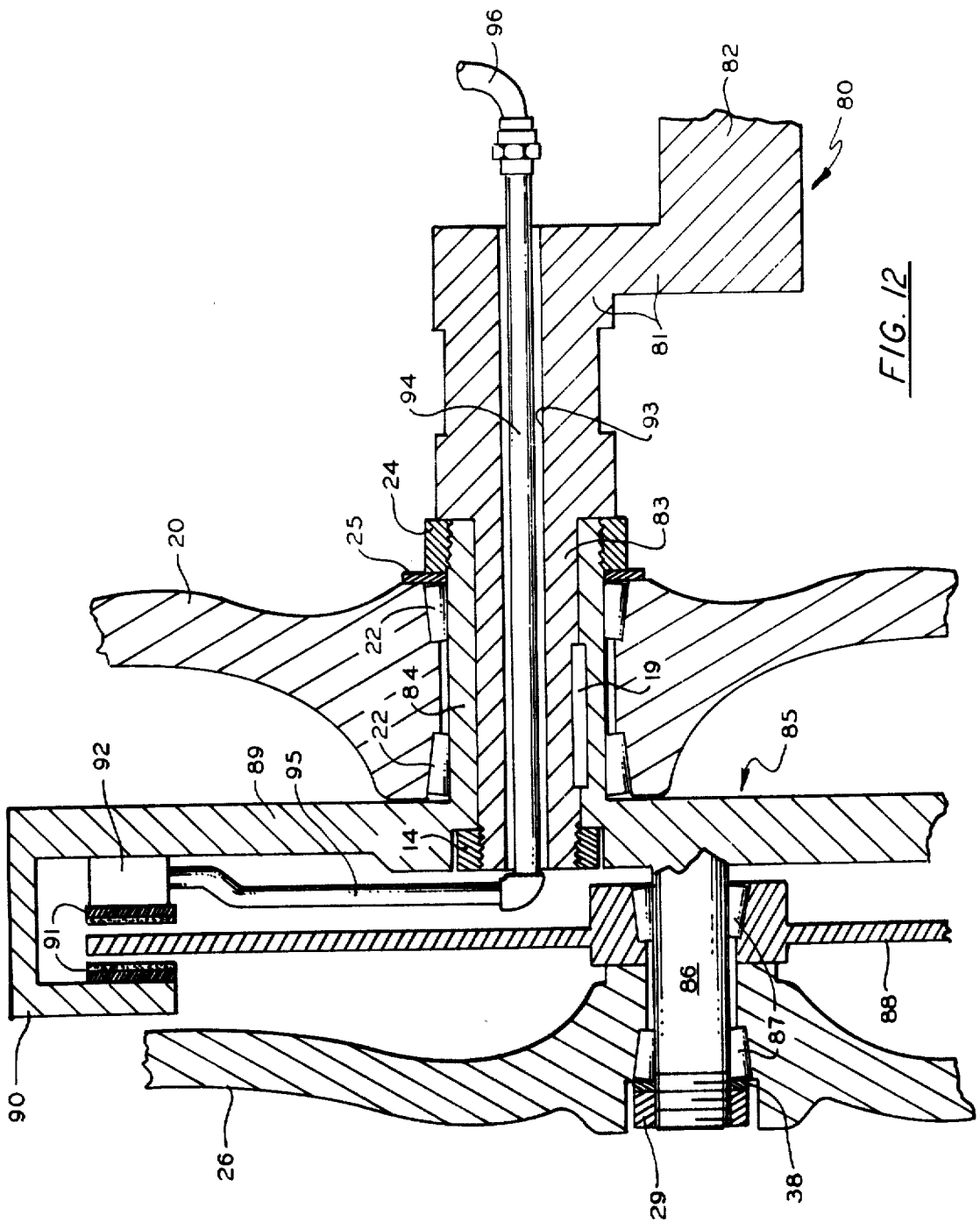
FIG. 12 is a view similar to FIG. 1 showing another embodiment of the axle of FIG. 1 with brake means for the highway wheel similar to those shown in FIGS. 10 and 11.

Referring now to FIG. 12, still another embodiment 80 of the axle assembly and braking means is shown fragmentarily. Axle 81 has an offset portion 82, like axle 61 of FIG. 11, and an end portion 83 on which is secured the railway wheel spindle portion 84 of an axle extension 85 by the nut 14, being keyed thereto at 19. Nut 24 secures the railway wheel 20 on spindle 84, the wheel being journalled thereon at 22.

Extension 85 has an offset spindle 86 for the highway wheel 26 and a securing nut 29 and journals 87 are provided. A brake drum in the form of disk 88 is secured to the wheel 26 or to its hub portion, as shown.

The portion 89 of axle extension 85 is annular with a portion 90 surrounding the brake disk 88. A brake shoe 91 is mounted on portion 90 and its operating hydraulic actuator 92 is mounted on portion 89, as shown.

The axle end 83 and the adjacent portion of axle 81 has a passage 93 axially therethrough and a hydraulic fluid tube 94 extends through the passage 93 and has an extension 95 connecting it to the brake shoe actuator 92. The inner end of the tube 94 is operatively connected by flexible tubing 96 through appropriate valve means to a source of fluid under pressure, not shown.

It will now be apparent that adequate brake means for the highway wheel is provided in each of the embodiments shown in FIGS. 6, 10, 11 and 12.

Reference is also made to expired U.S. Pat. No. 1,446,784 to Carter, issued Feb. 27, 1923, which discloses ramp means including a slanting ramp along the outer side of each railroad rail which rises gradually from the level of the rail-ties to the level of the top of the rails. It will be understood that in referring hereinabove to a highway-railway terminal, the terminal includes such a ramp, the highway wheels being lowered while the railway wheels are resting on the rails at the lower end of the ramp. When the vehicle is moved up the ramp the highway wheels engage the ramp and lift the vehicle off the rails and the vehicle may be moved to an adjacent location where the front wheel carriage or bogie may be removed and the front end of the vehicle secured to a tractor in the usual manner. Transfer of the vehicle from a trailer status to a railway status is accomplished by reversing the above steps.

It will be apparent that the axle assembly shown in FIG. 1, or a similar assembly, may be used also for the vehicle front wheels. The highway wheels being used only for a short distance at the highway-railway terminal, brake means for the front highway wheels may be eliminated in the interest of reducing the total weight of the vehicle.

I claim:

1. A rear axle assembly for a vehicle having a body and adapted to be towed for railway and highway travel, comprising: a normally non-rotating axle adapted to extend from side to side of the vehicle, the axle having a center portion adapted to underlie and support the vehicle body, and aligned axle ends integral with the center portion at each end thereof, the ends being adapted to underlie the sides of the vehicle, a separate axle extension at each end of the axle, the extension having an inwardly projecting annular spindle portion keyed and secured to the axle end and rotatably supporting a single flanged railway wheel, the extension also having an outwardly projecting spindle portion rotatably supporting a single pneumatically-tired highway wheel adjacent the railway wheel, the spindles being connected by a connecting arm extending radially of each spindle for offsetting the highway wheel radially of the railway wheel, the axle center portion having a projecting axle-turning portion extending radially therefrom, motor means adapted to be secured to the vehicle body and connected to the turning portion for limited rotation of the axle for raising and lowering the lower circumferential portions of the highway wheels above and below the lower circumferential portions of the railway wheels; and brake means for each highway wheel, including a brake drum portion, a brake shoe portion moveable into and out of engagement with the drum portion, a motor portion for moving the shoe portion, control portions for connecting the motor portion to a source of power, and connecting portions for connecting the other portions together and to the highway wheel; each axle extension having a passage therethrough extending in an axial direction and containing a brake portion, whereby at least one portion of each brake may be located under the vehicle body between the railway wheels.

2. A rear axle assembly for a vehicle having a body and adapted to be towed for railway or highway travel, comprising: a normally non-rotating axle adapted to extend from side to side of the vehicle, the axle having a center portion adapted to underlie and support the vehicle body, and aligned axle ends integral with the center portion at each end thereof, the ends being adapted to underlie the sides of the vehicle, a separate axle extension at each end of the axle, the extension having an inwardly projecting spindle portion keyed and secured to the axle end and rotatably supporting a single flanged railway wheel, the extension also having an outwardly projecting spindle portion rotatably supporting a single pneumatically-tired highway wheel adjacent the railway wheel, the spindles being connected by a connecting arm extending radially of each spindle for offsetting the highway wheel radially of the railway wheel, the axle center portion having a projecting axle-turning portion extending radially therefrom, motor means adapted to be secured to the vehicle body and connected to the turning portion for limited rotation of the axle for raising and lowering the lower circumferential portions of the highway wheels above and below the lower circumferential portions of the railway wheels; and brake means for each highway wheel, including a brake drum portion secured coaxially to the inner side of the railway wheel, a brake shoe portion supported on the axle center portion and adapted to be moved into and out of engagement with the brake drum portion, a motor portion and a control portion supported on the axle center portion for moving the shoe portion; the axle extension connecting arm having an axially extending passage therethrough, a planetary shaft journalled in the passage and having a planetary gear secured to each end thereof, the highway wheel having a coaxial gear secured to the inner side thereof in mesh with one planetary gear, and the railway wheel having a coaxial gear secured to the outer side thereof in mesh with the other planetary gear, whereby braking of the railway wheel drum is transmitted to the highway wheel.

3. A rear axle assembly for a vehicle having a body and adapted to be towed for railway and highway travel, comprising: a normally non-rotating axle adapted to extend from side to side of the vehicle, the axle having a center portion adapted to underlie and support the vehicle body, and aligned axle ends integral with the center portion at each end thereof, the ends being adapted to underlie the sides of the vehicle, a separate axle extension at each end of the axle, the extension having an inwardly projecting annular spindle portion keyed and secured to the axle end and rotatably supporting a single flanged railway wheel, the extension also having an outwardly projecting spindle portion rotatably supporting a single pneumatically-tired highway wheel adjacent the railway wheel, the spindles being connected by a connecting arm extending radially of each spindle for offsetting the highway wheel radially of the railway wheel, the axle center portion having a projecting axle-turning portion extending radially therefrom, motor means adapted to be secured to the vehicle body and connected to the turning portion for limited rotation of the axle for raising and lowering the lower circumferential portions of the highway wheels above and below the lower circumferential portions of the railway wheels; and brake means for each highway wheel, including a brake drum portion secured coaxially to the inner side of the highway wheel, and a cooperating brake shoe portion and a brake motor portion carried on the axle extension radial arm, the shoe portion being moveable into and out of engagement with the drum portion; the axle extension railway wheel supporting spindle having a passage extending therethrough in an axial direction radially offset from the axle end, and a brake control portion extending through the passage for connecting the the brake motor portion to a source of power carried on the axle center portion.

4. A rear axle assembly for a vehicle having a body and adapted to be towed for railway and highway travel, comprising: a normally non-rotating axle adapted to extend from side to side of the vehicle, the axle having a center portion adapted to underlie and support the vehicle body, and aligned axle ends integral with the center portion at each end thereof, the ends being adapted to underlie the sides of the vehicle, the center portion having connecting portions axially aligned with the end portions and an offset mid-section radially spaced from the axis of the connecting portions, a separate axle extension at each end of the axle, the extension having an inwardly projecting annular spindle keyed and secured to the axle end and rotatably supporting a single flanged railway wheel, the extension also having an outwardly projecting spindle portion rotatably supporting a single pneumatic-tired highway wheel adjacent the railway wheel, the spindles being connected by a connecting arm extending radially of each spindle for offsetting the highway wheel radially of the railway wheel, the axle center portion having a projecting axle-turning portion extending radially from the axle center portion beyond a line between the aligned axes of the axle ends, axle-turning motor means adapted to be secured to the vehicle body and connected to the turning portion for limited rotation of the axle for raising and lowering the highway wheels with respect to the railway wheels, the connecting portions of the axle center portion and the axle ends having an axially extending passage therethrough and through the annular railway wheel supporting spindle; and brake means for each highway wheel, including a brake drum portion secured coaxially on one end of a drum shaft rotatably supported on the axle center portion, the drum shaft having its axis angularly offset from the end portion and from the offset axle center portion midsection, a cooperating powered and moveable brake shoe portion supported on the axle center portion, a gear rotatable with the brake drum portion being secured on the other end of the drum shaft, the highway wheel having a gear coaxially secured to the inner side thereof, and a second shaft rotatably supported in the axially extending passage and having secured on one end thereof a gear in mesh with the highway-wheel-secured-gear and having secured on its other end a gear in mesh with the gear on the angularly offset drum shaft, whereby rotation of the highway wheel is transmitted to the brake drum portion and braking friction applied to the brake drum portion is is operatively effective at the highway wheel.

5. A rear axle assembly for a vehicle having a body and adapted to be towed for railway and highway travel, comprising: a normally non-rotating axle adapted to extend from side to side of the vehicle, the axle having a center portion adapted to underlie and support the vehicle body, and aligned axle ends integral with the center portion at each end thereof, the ends being adapted to underlie the sides of the vehicle, the center portion having connecting portions axially aligned with the end portions and an offset midsection radially spaced from the axis of the connecting portions, a separate axle extension at each end of the axle, the extension having an inwardly projecting annular spindle keyed and secured to the axle end and rotatably supporting a single flanged railway wheel, the extension also having an outwardly projecting spindle portion rotatably supporting a single pneumatic-tired highway wheel adjacent the railway wheel, the spindles being connected by a connecting arm extending radially of each spindle for offsetting the highway wheel radially of the railway wheel, the axial center portion having a projecting axle-turning portion extending radially from the axle center portion beyond a line between the aligned axes of the axle ends, axle turning motor means adapted to be secured to the vehicle body and connected to the turning portion for limited rotation of the axle for raising and lowering the highway wheels with respect to the railway wheels, the connecting portions of the axle center portion and the axle ends having an axially extending passage therethrough and through the annular railway wheel supporting spindle; and brake means for each highway wheel, including a rotating brake drum portion secured coaxially to the inner side of the highway wheel, non-rotating brake shoe and shoe-moving portions supported on the axle extension connecting arm and angularly spaced from the highway wheel supporting spindle, a source of power for the shoe-moving portions supported on the axle center portion, operating means for moving the brake shoe portions secured to the axle extension connecting arm and lying between the railway wheel and the highway wheel, and a brake control portion extending through the axially extending passage connecting the shoe-moving portions to the source of power, whereby the brake shoe portions may be operated from a source of power between the railway wheels.

* * * * *